US012348374B2

(12) United States Patent
Shachar et al.

(10) Patent No.: US 12,348,374 B2
(45) Date of Patent: Jul. 1, 2025

(54) CONTAINER BASED LIMIT ENFORCEMENT

(71) Applicant: Dell Products L.P., Round Rock, TX (US)

(72) Inventors: Tomer Shachar, Beer-Sheva (IL); Yevgeni Gehtman, Modi'in (IL); Ophir Jehoshua Buchman, Raanana (IL)

(73) Assignee: Dell Products L.P., Round Rock, TX (US)

( * ) Notice: Subject to any disclaimer, the term of this patent is extended or adjusted under 35 U.S.C. 154(b) by 28 days.

(21) Appl. No.: 18/488,539

(22) Filed: Oct. 17, 2023

(65) Prior Publication Data

US 2025/0126018 A1    Apr. 17, 2025

(51) Int. Cl.
*H04L 41/0895* (2022.01)
*H04L 41/0826* (2022.01)

(52) U.S. Cl.
CPC ...... *H04L 41/0895* (2022.05); *H04L 41/0826* (2013.01)

(58) Field of Classification Search
None
See application file for complete search history.

(56) References Cited

U.S. PATENT DOCUMENTS

| | | | | |
|---|---|---|---|---|
| 10,015,132 B1 * | 7/2018 | Qin | ...... | H04L 61/2567 |
| 10,732,962 B1 * | 8/2020 | Florescu | ...... | G06F 11/0706 |
| 10,943,014 B2 * | 3/2021 | Stopel | ...... | G06F 21/53 |
| 11,868,494 B1 * | 1/2024 | Zhuang | ...... | G06F 16/22 |
| 2014/0372382 A1 * | 12/2014 | Hrebicek | ...... | G06F 16/21 |
| | | | | 707/694 |
| 2015/0378709 A1 * | 12/2015 | D'Amico | ...... | G06F 8/62 |
| | | | | 717/176 |
| 2016/0085841 A1 * | 3/2016 | Dorfman | ...... | G06F 9/468 |
| | | | | 707/738 |
| 2017/0197750 A1 * | 7/2017 | Wolf | ...... | B65D 5/66 |
| 2017/0201597 A1 * | 7/2017 | Narasimhan | ...... | H04L 49/90 |
| 2017/0324828 A1 * | 11/2017 | Clavera | ...... | H04L 67/131 |
| 2018/0316725 A1 * | 11/2018 | Mani | ...... | H04L 67/125 |
| 2019/0065278 A1 * | 2/2019 | Jeuk | ...... | G06F 9/5077 |
| 2019/0222988 A1 * | 7/2019 | Maes | ...... | H04L 67/10 |

(Continued)

FOREIGN PATENT DOCUMENTS

| | | | | |
|---|---|---|---|---|
| EP | 3455775 B1 * | 5/2022 | ...... | G06F 21/53 |
| WO | WO-2021242160 A1 * | 12/2021 | ...... | G06F 21/53 |

(Continued)

*Primary Examiner* — Sandarva Khanal
(74) *Attorney, Agent, or Firm* — WOMBLE BOND DICKINSON (US) LLP (57) ABSTRACT

Methods and systems for managing operation of endpoint devices are disclosed. The operation of the endpoint devices may be managed by deploying containers to the endpoint devices. The containers may include applications and/or other components. The applications may provide various desired services. The containers may also limit use of host endpoint devices based on activity profiles for the requestors of services provided by the applications and the services provided by the applications. The activity profiles may be used on historical information regarding similar requestors and similar services. At least some of the containers may be nested and may separately apply different sets of limits.

20 Claims, 8 Drawing Sheets

(56) References Cited

U.S. PATENT DOCUMENTS

| | | | |
|---|---|---|---|
| 2019/0332421 A1* | 10/2019 | Kozlowski | G06F 9/4856 |
| 2019/0372850 A1* | 12/2019 | Fandli | H04L 63/12 |
| 2020/0065085 A1* | 2/2020 | Talbert | G06F 8/65 |
| 2020/0162472 A1* | 5/2020 | Zadeh | G06F 9/44505 |
| 2022/0198034 A1* | 6/2022 | Rodriguez | H04L 9/30 |
| 2022/0217181 A1* | 7/2022 | Viswanathan | H04L 63/08 |
| 2024/0086522 A1* | 3/2024 | Grover | G06F 21/566 |

FOREIGN PATENT DOCUMENTS

| | | | | |
|---|---|---|---|---|
| WO | WO-2022165347 A1 * | 8/2022 | | H04L 41/0893 |
| WO | WO-2024206146 A1 * | 10/2024 | | H04L 41/0894 |

* cited by examiner

CONTAINER BASED LIMIT ENFORCEMENT

FIELD

Embodiments disclosed herein relate generally to device management. More particularly, embodiments disclosed herein relate to systems and methods to manage limits on use of devices.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for providing services using endpoint devices. To provide services using endpoint devices, the endpoint devices may host various pieces of software, may be configured in certain manners, and/or may be adapted to provide the computer implemented services in various ways.

During operation, the services may utilize various hardware resources of the endpoint devices providing the services. To manage use of the hardware resources, activity profiles for requestors of services and the services may be maintained and used to impose limits on use of hardware resources.

The activity profiles may include limits derived from common activity of requestors and services. The common activity may be statistically analyzed to identify, for example, common uses of services and common amounts of resources used in the uses of the services.

When new services are requested, containerized services may be deployed that limit the use of host devices and services provided based on the activity profiles. For example, activity profiles corresponding to the services and requestors may be identified. The limits specified by these activity profiles may be used to define how containers that will host application that provide the services are to behave.

The resulting containers and hosted applications may provide the services in a manner that is limited to how the services are typically provided and used by similar requestors and provided by similar instances of the services in the past. Consequently, the limited available resources of devices may be manned through deployment of containerized services (e.g., a container that hosts certain applications, drivers, etc. and that utilizes a container framework to access allocated hardware resources).

In an embodiment, a method for managing operation of endpoint devices of edge infrastructure is provided. The method may include obtaining a container definition for a containerized service; instantiating a first container based on a first portion of the container definition; instantiating a second container hosted by the first container, the second container being based on a second portion of the container definition to obtain an instance of the containerized service; and providing computer implemented services using the containerized service hosted by an endpoint device of the endpoint devices.

Providing the computer implemented services may include activating a function of an application hosted by the second container; and preventing, by the first container, at least a first portion of the function from being completed by the second container.

The second container may be adapted to enforce at least one selected from a group consisting of: a limit on use of a processor core of the endpoint device; and a limit on use of memory of the endpoint device.

Providing the computer implemented services may also include preventing, by the second container, at least a second portion of the function from being completed.

The second container may be adapted to enforce at least one selected from a group consisting of: a limit on accessing data stored in directories of the endpoint device; and a limit on access to network endpoints through the endpoint device.

The first portion of the container definition may be based on a requestor activity profile for a requestor of the containerized service, the requestor activity profile may specify a first set of limits on use of the endpoint device by the requestor.

The first set of limits may include a first limit on use of hardware resources of the endpoint device; a second limit on use of applications hostable by the endpoint device; a third limit on use of portions of data hostable by the endpoint device; and a fourth limit on distribution, by the requestor, of data hosted by the endpoint device.

The requestor activity profile may be based on at least two measured activity profiles of users classified as having a same persona, and the at least two measured activity profiles may specify characteristics of users of corresponding endpoint devices of the endpoint devices used to provide other instances of the service to the users.

The second portion of the container definition may be based on a service activity profile that specifies a second set of limits on use of the endpoint device by at least one application that provides, at least in part, the service.

The first container may be adapted to enforce the first set of limits and the second container is adapted to enforce the second set of limits.

The second set of limits may include a maximum quantity of computing resources of the endpoint device usable to provide the service; a network connectivity limit for the service;
  a network reachability limit for the service; and a storage area access limit for the service.

The service activity profile may be based on at least two measured activity profiles of users classified as having a same persona, and the at least two measured activity profiles specifying characteristics of applications may be used to provide other instances of the service.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may initiate performance the computer-implemented method when the computer instructions are executed by the processor.

Figure 1A:
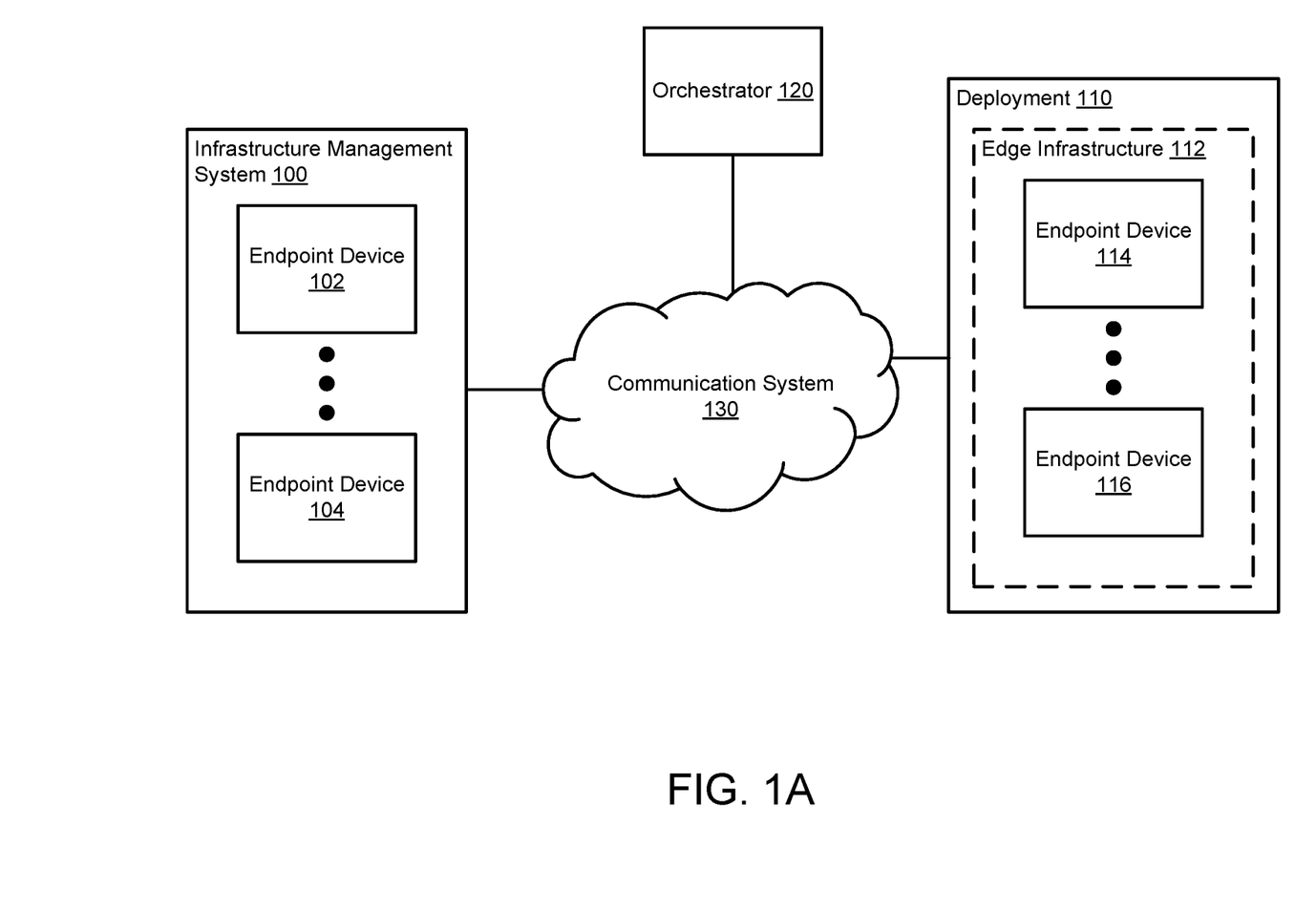
FIG. 1A shows a block diagram illustrating a system in accordance with an embodiment.

Turning to FIG. 1A, a block diagram illustrating a system in accordance with an embodiment is shown. The system shown in FIG. 1A may provide computer-implemented services. The computer implemented services may include any type and quantity of computer implemented services. For example, the computer implemented services may include data storage services, instant messaging services, database services, transaction processing services, and/or any other type of service that may be implemented with a computing device.

To provide the computer implemented services, the system may include deployment 110. Deployment 110 may include edge infrastructure 112 which may include any number of endpoint devices (e.g., 114, 116). The endpoint devices may cooperatively and/or individually provide all, or a portion of the computer implemented services.

To contribute to the computer implemented services, the endpoint devices may host certain software, may be configured in certain manners (e.g., network communication configurations, software/hardware configurations, etc.), and/or may otherwise be modified to meet one or more requirements to contribute to the computer implemented services. Further, groups of endpoint devices may be modified to cooperatively provide various services. For example, some endpoint devices of a group may host some software to provide some functions while other endpoint devices of a group may host different software to provide other functions which, in aggregate, allow desired computer implemented services to be provided.

However, due to the placement of endpoint devices (e.g., at an edge installation) and the resources of the endpoint devices, the endpoint devices may be more susceptible to malicious activity. For example, any of the endpoint devices may be part of an edge installation (e.g., 112) which may subject the endpoint devices to physical attacks (e.g., malicious devices may be operably connected to the endpoint devices by attaching the malicious device to a port of a network interconnecting the endpoint devices), network attacks (e.g., networks that support operation of the edge installation may include fewer security mechanisms than would be present in other computing environments such as data centers), and/or the endpoint device may be subject to more vectors of attack for other reason when compared to computing devices located in other computing environments.

In general, embodiments disclosed herein may provide methods, systems, and/or devices for managing the operation of edge infrastructure. To manage the edge infrastructure, a management framework for edge devices of the edge infrastructure may be enforced. The management framework may limit the use of edge infrastructure to provide desired services.

The use of the edge infrastructure may be limited using activity profiles. The activity profiles may be based on historical activity of users and/or various applications, and may define limits to be imposed on environments used to provide requested services.

The limits may be used to create definitions for environments. For example, container definitions may be generated based on activity profiles for users and activity profiles for services. The container definitions may be multiple layer and indicate that multiple, nested containers are to be created. Different containers in a hierarchy may enforce different limits on the use of endpoint devices.

The resulting container definition may be deployed to an endpoint device to instantiate a new instance of an environment customized to provide requested services while limiting use of the endpoint device in providing the services. For example, multiple, nested containers arranged hierarchically may be deployed using the container definition.

By doing so, embodiments disclosed herein may provide a system that is more likely to provide desired computer implemented services through profile based resource and use allocation for services.

To provide the above noted functionality, the system of FIG. 1A may include infrastructure management system 100, deployment 110, orchestrator 120, and communication system 130. Each of these components is discussed below.

Infrastructure management system 100 may facilitate management of deployment 110. Infrastructure management system 100 may include any number of endpoint devices (e.g., 102, 104). The endpoint devices may be used by administrators and/or other persons that manage deployment 110 to provide desired computer implemented services.

For example, endpoint devices 102-104 may present portals and/or other interfaces through which information regarding services to be provided by components of edge infrastructure 112 may be presented.

Additionally, infrastructure management system 100 may in isolation and/or cooperation with orchestrator 120 generate activity profiles for applications and requestors. To do so, infrastructure management system 100 may collect information regarding various requestors' uses of services provided by deployment 110, and information regarding use of deployment 110 by services used by the requestors. The collected information may be used to establish activity profiles for requestors and services. The activity profiles may define limits on use of deployment 110.

Orchestrator 120 may manage deployment 110. To manage deployment 110, orchestrator 120 may present interfaces to users of data processing systems 102-104 of infrastructure management system 100. The interfaces may allow privileged users (e.g., administrators, etc.) to manage services provided by endpoint devices 114-116. When doing so, orchestrator 120 may instantiate containerized services that comply with limits defined by various activities profiles (e.g., for requestors and requested services). Orchestrator 120 may utilize an automation framework to instantiate instances of the containerized services on endpoint devices 114-116 to enable the endpoint devices to provide desired services to various users in a manner that meets limits imposed by the management framework enforced across the system of FIG. 1A.

Deployment 110, as noted above, may provide computer implemented services. To provide the computer implemented services, the endpoint devices of deployment 110 may host various services (e.g., which may be implemented using containers).

Figure 1B:
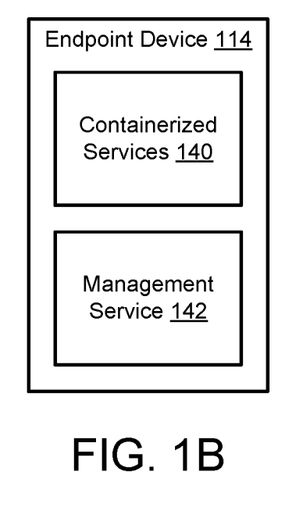
FIG. 1B shows a block diagram illustrating an endpoint device in accordance with an embodiment.

To provide the services, deployment 110 (e.g., endpoint devices 114-116) may host an automation framework for instantiating container instances based on container definitions generated by orchestrator 120. The container definitions may comply with the management framework, thereby ensuring that the resulting containers also impose limits on operation of the containers based on activity profiles. Refer to FIG. 1B for additional details regarding endpoint devices 114-116. Refer to FIG. 2C for additional details regarding instances of containerized services.

When providing their functionality, any of (and/or components thereof) infrastructure management system 100, deployment 110, and/or orchestrator 120 may perform all, or a portion, of the actions and methods illustrated in FIGS. 2A-3B.

Any of (and/or components thereof) infrastructure management system 100, deployment 110, and orchestrator 120 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1A may be operably connected to each other (and/or components not illustrated) with communication system 130. In an embodiment, communication system 130 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1A as including a limited number of specific components, a system in accordance with an embodiment may include fewer, additional, and/or different components than those illustrated therein.

Turning to FIG. 1B, a block diagram of endpoint device 114 in accordance with an embodiment is shown. Edge infrastructure 112 may include any number of endpoint devices similar to endpoint device 114.

Endpoint device 114 may host any number of containerized services 140 and management service 142. Containerized services 140 may include any number of instances of containers that include various applications that provide desired services. The containers may be based on container definitions that enforce limits imposed by various activity profiles on which the container definitions are based. Containerized services 140 may provide any number and type of computer implemented services in isolation and/or in combination with services hosted by other endpoint devices.

A containerized service may include applications hosted by nested containers that are arranged in a hierarchical manner. The containers may impose limits based on corresponding activity profiles. Consequently, the applications may be limited by the container environments in which the applications exist. In this manner, limits may be enforced on applications, and serviced provided thereby, without requiring that the applications be customized.

Management service 142 may manage containerized services 140. Orchestrator 120 may provide container definitions to management service 142, and instructions regarding the number of instances of containers to be maintained based on each container definition. Management service 142 may instantiate and terminate operation of containerized services 140 to maintain compliance with the instructions from orchestrator 120.

Figure 2A:
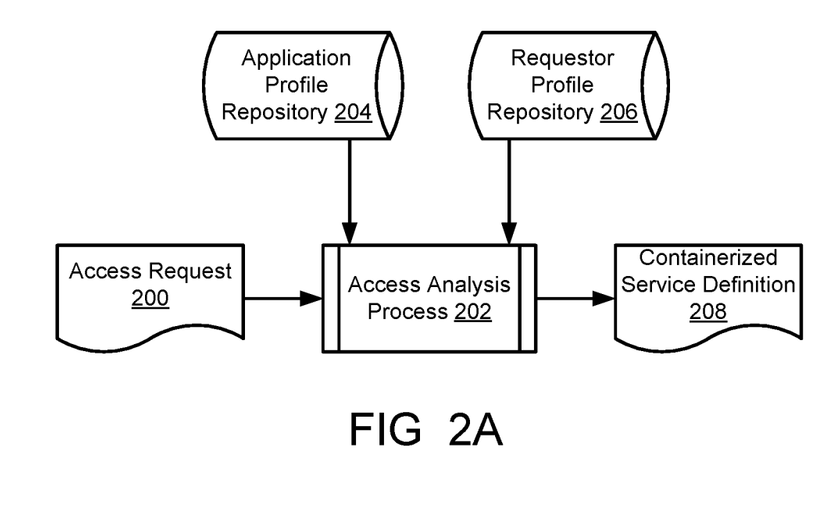
FIGS. 2A-2B show data flow diagrams in accordance with an embodiment.
Figure 2B:
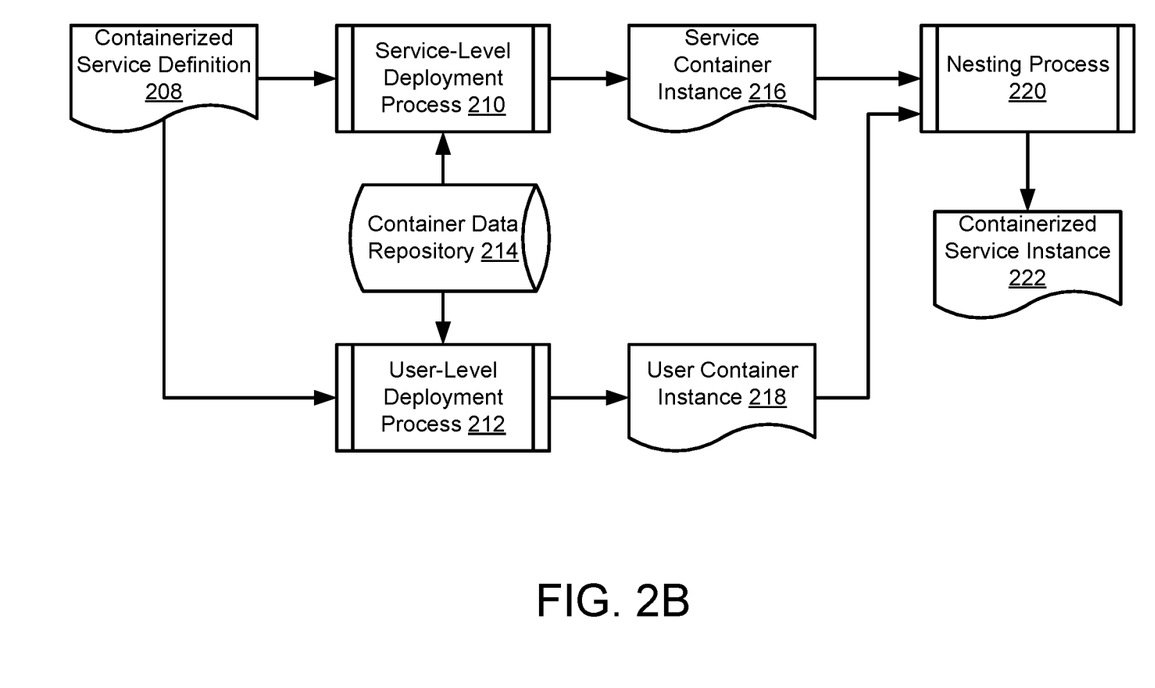
Figure 2C:
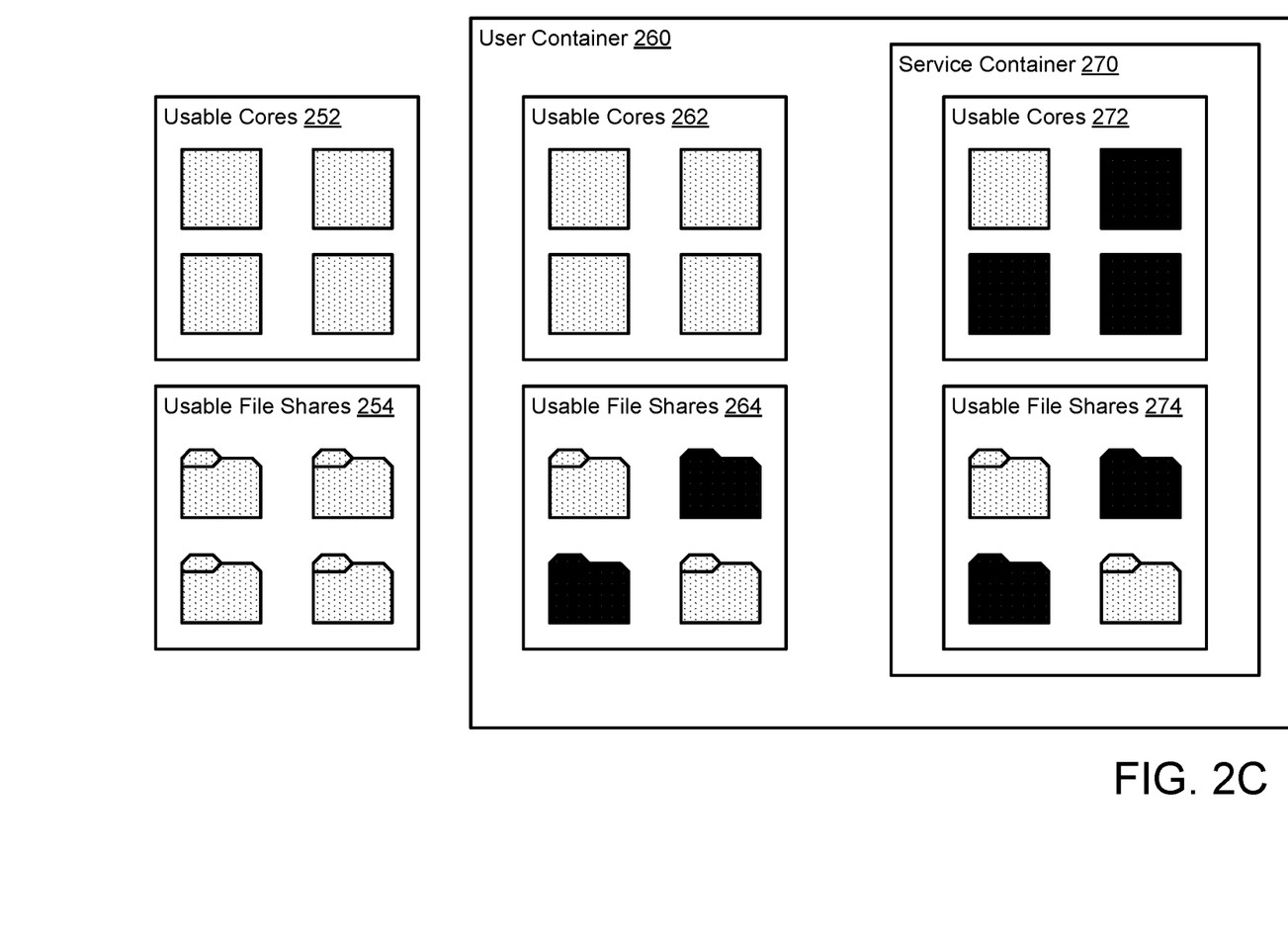
FIG. 2C shows a block diagram illustrating a containerized service in accordance with an embodiment.

To further clarify embodiments disclosed herein, data flow diagrams in accordance with an embodiment are shown in FIGS. 2A-2B. In the diagrams, flows of data and processing of data are illustrated using different sets of shapes. A first set of shapes (e.g., 200, 208, etc.) is used to represent data structures, a second set of shapes (e.g., 202, 210, etc.) is used to represent processes performed using and/or that generate data, and a third set of shapes (e.g., 204, 206, etc.) is used to represent large scale data structures such as databases.

Turning to FIG. 2A, a first data flow diagram in accordance with an embodiment is shown. The first data flow diagram may illustrate data used in and data processing performed in obtaining containerized service definitions for services to be provided to requestors.

To obtain a containerized service definition, a requestor (e.g., administrator, user, etc.) may provide user input using an interface (e.g., presented by an infrastructure management system). The interface may allow the requestor to request that a service be provided. The user input may be treated as access request 200 (e.g., a request for access to a service to be provided by an endpoint device).

Once obtained, access request 200 may be ingested by access analysis process 202. During access analysis process 202, access request 200 may be processed to obtain containerized service definition 208.

To process access request 200, the requestor and the type of service to be provided may be identified.

The requestor may be used to identify a requestor activity profile from requestor profile repository 206. To perform the lookup, the requestor may be classified as a type of a requestor. For example, the type of the requestor may be (and/or be based on) a position title (e.g., sales associate, software developer, etc.) of the requestor, a type of activity commonly performed by the requestor (e.g., sales, software development), and/or another type of characteristic which may be ascribed to the requestor. Each requestor may be pre-classified into a corresponding type via an automated process (e.g., machine learning), a semi-automated process (e.g., machine learning with manual review), or a manual process (e.g., classified by a subject matter expert). The lookup may return an activity profile for the type of the requestor. The activity profiles of requestor profile repository 206 may each be associated with corresponding types of requestors.

The activity profiles of requestor profile repository 206 may be based on historical information regarding the use of services and endpoint devices may any number of requestors for each type of requestor. For example, the historical use of services of requestor of each type may be statistically analyzed to identify (i) commonly used directories, (ii) commonly accessed website, (iii) common rates of use of network bandwidth, (iv) common number of internet browsers concurrently open, and/or other aspects regarding common use of services provided by endpoint devices by requestors of each type of requestor.

The aforementioned data may be collected by passively monitoring actual use of endpoint devices by various types of requestors.

The resulting requestor activity profiles for each type of requestor may define various limits (e.g., a first set of limits based on the requestor) on the user of endpoint devices, services provided by endpoint devices, etc.

The service may be used to identify a service activity profile from application profile repository 204. To perform the lookup, the service may be classified as a type of a service. For example, the type of the service may be (and/or be based on) a type of application used to provide the service, a goal of the service, and/or another type of characteristic which may be ascribed to the service. Each service may be pre-classified into a corresponding type via an automated process (e.g., machine learning), a semi-automated process (e.g., machine learning with manual review), or a manual process (e.g., classified by a subject matter expert). The lookup may return an activity profile for the type of the service. The activity profiles of application profile repository 204 may each be associated with corresponding types of service.

The activity profiles of application profile repository 204 may be based on historical information regarding the use of endpoint device by any number of services for each type of service. For example, the historical use of endpoint devices by services of each type may be statistically analyzed to identify (i) commonly used quantities of computing resources (e.g., certain amounts of memory, processor cycles, storage space), (ii) commonly used network interfaces, (iii) commonly connected to network endpoints/URLs, (iv) commonly used directories for file storage/access, and/or other aspects regarding common use of endpoint devices by services of each type of service.

The aforementioned data may be collected by passively monitoring actual use of endpoint devices by various types of services.

The resulting application activity profiles for each type of service may define various limits (e.g., a second set of limits based on the requested service) on use of endpoint devices by services.

Once the activity profiles are obtained, containerized service definition 208 may be generated. Containerized service definition 208 may be generated by (i) adding information regarding instances of applications to be hosted by a container based on the requested service (e.g., each type of service may be associated with one or more applications), and (ii) limits to be imposed by the container on the applications based on the activity profiles. Containerized service definition 208 may be implemented using various instructions aggregated together than when executed by an automated framework instantiate a desired containerized service, and/or may be an image (or other type of file) of one or more containers, applications hosted thereby, etc. that is usable to instantiate a containerized service instance.

Containerized service definition 208 may be generated by using different containers to apply limits corresponding to different activity profiles. For example, an outer most container may apply limits specified by a requestor activity profile while an inner (e.g., hosted) container may apply limits specified by a service activity profile.

The resulting container instances generated using containerized service definition 208 may include various applications, drivers, and/or other entities that impose the limits specified by the activity profiles. Such entities may be automatically generated and/or defined based on historic information, subject matter expert input, and/or via other methods.

Turning to FIG. 2B, a second data flow diagram in accordance with an embodiment is shown. The second data flow diagram may illustrate data used in and data processing performed in instantiating containerized services.

To instantiate containerized services, containerized service definition 208 may be provided to an automation framework hosted by an endpoint device. Once provided, containerized service definition 208 may be ingested by service-level deployment process 210 and user-level deployment process 212. During each of these processes, new instances of containers for a containerized service (e.g., 222) may be instantiated. For example, a container image may be read from containerized service definition 208 and/or may be generated based on instructions from containerized service definition 208.

If generated, various components for the image may be read from container data repository 214 (e.g., which may include images of various applications, drivers, operating systems, etc. usable to compose a container image). The components stored on container data repository 214 may be associated with and/or otherwise identified by the instructions from containerized service definition 208.

Once the container image is obtained, various information from the container may be loaded into memory, various hardware resources may be reserved for the container (e.g., to create a user space), and/or other operations may be performed to instantiate new instance of containers (e.g., 216, 218) for containerized service instance 222. Once the containers are obtained (and/or as part of obtaining the containers), nesting process 220 may be performed. During nesting process 220, service container instance 216 may be nested (e.g., hosted) by user container instance 218 (e.g., by establishing interfaces, moving the data for the container instances to prescribed memory locations, etc.). The nesting process may generate containerized service instance 222.

After the data structures for containerized service instance 222 are loaded into memory/storage and the resources are reserved, program code for the containerized service instance 222 may begin to be executed thereby causing the nested containers and applications to initiate operation.

However, because the resulting containerized service instance is based on containerized service definition 208, the operation of the applications of containerized service instance 222 may be limited in accordance with the activity profiles. Consequently, if a user begins to interact with containerized service instance 222, the extent to which the instance is usable may be limited to meet the limits imposed by the activity profiles on which containerized service definition 208 is based. For example, different containers of containerized service instance 222 may impose different limits on hosted applications. Refer to FIG. 2C for additional details regarding containerized services that utilize nested containers.

In this manner, different requestors that may request use of a similar service may be provided services limited in different manners. For example, if a first requestor is a less privileged user that is barred from accessing certain websites, the requestor activity profile associated with the less privileged user may cause a corresponding container of a containerized service to screen access to the certain websites from the container. Accordingly, the first requestor may be effectively screened and/or limited through selective deployment of nested containers with content that varies based on the requestor and the service.

To do so, for example, container data repository 214 may include components such as various custom drivers that limit network interfaces, network connectivity, block use of hardware components, etc. Likewise, container data repository 214 may include various versions of applications with limits on the user of hardware resources of endpoint devices.

In this manner, various limits on shared resources (e.g., endpoint devices) and activity performed by the shared resources may be managed.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the data structures illustrated using the first and third set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Turning to FIG. 2C, a diagram illustrating resources, and limitations on those resources in accordance with an embodiment is shown.

To manage use of shared resources, a containerized service may be deployed. The containerized service may include any number of containers (e.g., 260, 270) corresponding to different activity profiles. The containers may be nested to establish a hierarchy, which may be defined by a containerized service definition.

Each container may apply different limits on use of various hardware, data, and/or other aspects of the native functionality of a host endpoint device. For example, a host endpoint device may include usable cores 252. The blocks with dotted in-fill in the box labeled as usable cores 252 may represent different processor cores of an endpoint device. Similarly, the host endpoint device may include various usable file shares 254 through which corresponding portions of data may be obtained. The file-folder shaped blocks with dotted in-fill in the box labeled as usable file shares 254 may represent different files shares available to the host endpoint device.

To limit use of these native resources (e.g., 252, 254), user container 260 and service container 270 may apply various limits to access to usable cores 252 and usable file shares 254 to entities within the environments defined by the containers. User container 260 may be a container with limits imposed by a requestor activity profile and service container 270 may be a container with limits imposed by a service activity profile. Service container 270 may be hosted by user container 260. Thus, the limits imposed by both of these containers may be imposed on applications hosted by service container 270.

Now, consider an example scenario where the requestor profile limits access to some of usable file shares 264 (e.g., by including a communications driver that is unable to connect to these file shares) and the service activity profile limits access to some of usable cores 252.

In this scenario, as seen in FIG. 2C, the environment within user container 260 may not limit use of usable cores 262 (e.g., logical cores corresponding to usable cores 252) but may limit use of usable file shares 264 (e.g., logical file shares corresponding to usable file shares 254. In FIG. 2C, the limited usable file shares 264 are illustrated with black in-fill (e.g., in other words, two of usable file shares 254 are unusable by entities hosted by user container 260).

Further, in this scenario, as seen in FIG. 2C, the environment within user container 260 may limit use of both usable cores 272 (e.g., logical cores corresponding to usable cores 252) but may not limit use of usable file shares 274 (e.g., logical file shares corresponding to usable file shares 254). However, by virtue of being hosted by user container 260, use of usable file shares 274 may be limited by the limits imposed on it by user container 260. Thus, the applications hosted by service container 270 may be subject to the limits imposed on usable cores 252 (e.g., only one usable core) as well as subject to the limits imposed on usable file shares 254 (e.g., only two shares being available) by virtue of the limits imposed by user container 260.

Thus, in this manner, hierarchically and nested containers may be used to apply limits on applications corresponding to different activity profiles.

While illustrated in FIG. 2C as hosting a single service container instance, it will be appreciated that a user container may host multiple different service container instances. In this manner, the number of containers used to apply limits may be reduced when compared to scenarios in which each user container only hosts a single service container.

Figure 3A:
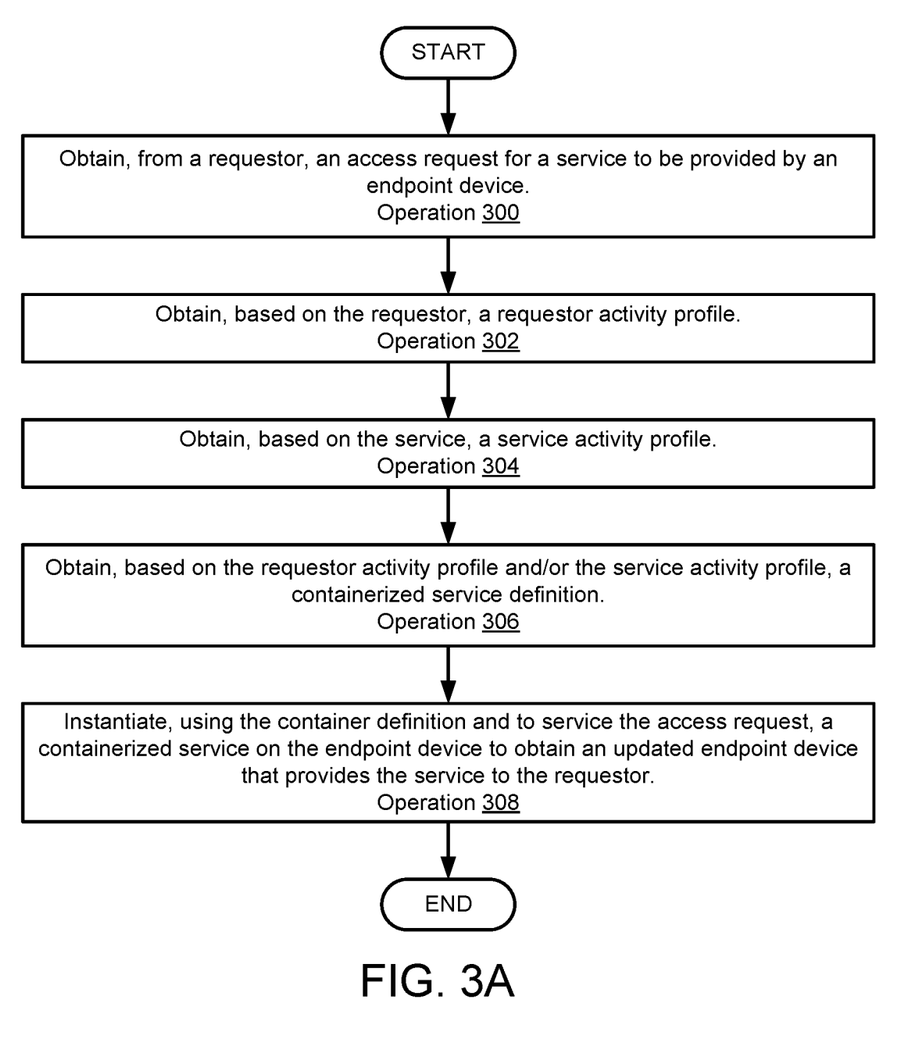
FIGS. 3A-3B show flow diagrams illustrating methods in accordance with an embodiment.
Figure 3B:
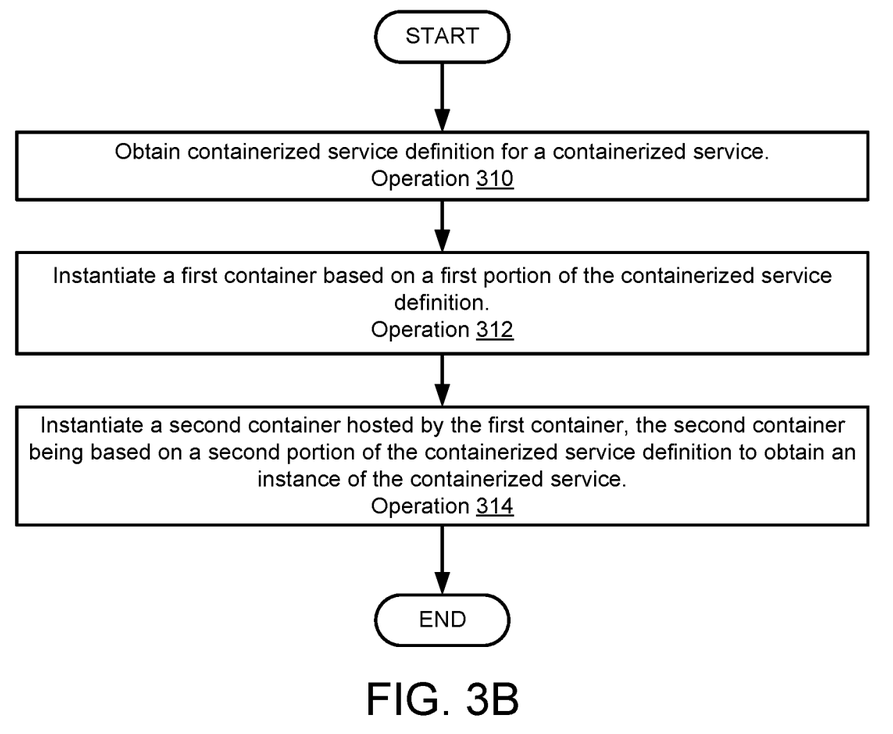

As discussed above, the components of FIG. 1A may perform various methods to manage operation of endpoint devices. FIGS. 3A-3B illustrate methods that may be performed by the components of the system of FIG. 1A. In the diagrams discussed below and shown in FIGS. 3A-3B, any of the operations may be repeated, performed in different orders, and/or performed in parallel with or in a partially overlapping in time manner with other operations.

Turning to FIG. 3A, a first flowchart illustrating a method of managing the operation of endpoint devices in accordance with an embodiment is shown. Any of the component shown in FIG. 1A may perform all, or a portion, of the method shown in FIG. 3A.

At operation 300, an access request for a service to be provided by an endpoint device may be obtained from a requestor. The access request may be obtained by reading the access request from storage, receiving the access request from another device, by generating the access request based on user input, and/or via other methods.

At operation 302, a requestor activity profile may be obtained based on the requestor. The requestor activity profile may be obtained by classifying the requestor, and using the classification for the requestor to perform a lookup in a requestor activity profile repository. The lookup may return the requestor activity profile.

At operation 304, a service activity profile may be obtained based on the service. The service activity profile may be obtained by classifying the service, and using the classification for the service to perform a lookup in a service activity profile repository (e.g., an application profile repository). The lookup may return the service activity profile.

The requestor activity profile and the service activity profile may each specify any number of limits on use of endpoint devices for providing the service to the requestor.

At operation 306, a containerized service definition may be obtained based on the requestor activity profile and/or the service activity profile. The containerized service definition may be obtained by reading it from storage, receiving it from another device, by generation, and/or via other methods. If generated, the containerized service definition may be obtained by add information and/or components to it regarding applications that will provide the service and limits on nested containers that host the applications. The applications may be based on the service and the limits may be based on limits specified by the requestor/service activity profiles and/or other types of profiles. While described with respect to specific example, other types of activity profiles may be used without departing from embodiments disclosed herein.

At operation 308, a containerized service may be instantiated on the endpoint device to obtain an updated endpoint device that provides the service to the requestor using the container definition and to service the access request. The containerized service may be instantiated by providing the container definition to an automation framework. The automation framework may instantiate the containerized service based on the container definition. The containerized service may be instantiated using the method shown in FIG. 3B.

The method may end following operation 308.

The resulting containerized service may provide service in a manner that is limited by the limits specified by the requestor/activity profiles. Consequently, the resulting services may be limited to match those normally consumed by typical requestors and provided by typical instances of the services provided by the typical requestors in the past. The imposed limits may, consequently, limit the activity provided in accordance with the service to those typically expected for typical requestors that utilize similar services.

Turning to FIG. 3B, a second flowchart illustrating a method of managing the operation of endpoint devices in accordance with an embodiment is shown. Any of the component shown in FIG. 1A may perform all, or a portion, of the method shown in FIG. 3B.

At operation 310, a containerized service definition for a containerized service is obtained. The containerized service definition may be obtained by reading it from storage, receiving it from another device, by generation, and/or via other methods. If generated, the containerized service definition may be obtained by add information and/or components to it regarding applications that will provide the service and limits on nested containers that host the applications. The applications may be based on the service and the limits may be based on limits specified by the requestor/service activity profiles and/or other types of profiles. While described with respect to specific example, other types of activity profiles may be used without departing from embodiments disclosed herein.

At operation 312, a first container based on a first portion of the containerized service definition is obtained. The first container may be obtained by instantiating it using the first portion. For example, data may be stored in memory, data may be written to storage, and program code may be loaded into and/or executed by a processor.

At operation 314, a second container hosted by the first container is instantiated. The second container may be based on a second portion of the containerized service definition to obtain an instance of the containerized service. The second container may be obtained by instantiating it using the second portion. For example, data may be stored in memory, data may be written to storage, and program code may be loaded into and/or executed by a processor.

The method may end following operation 314.

Once instantiated, the containerized service may provide desired computer implemented services limited in accordance with activity profiles. For example, The computer implemented services may be provided by activating (e.g., by receiving user input) a function of an application hosted by the second container; and preventing, by the first container, at least a first portion of the function from being completed by the second container. For example, the second container may block and/or otherwise restrict access to processor cores thereby preventing the hosted applications from consuming more computing resources when warranted.

Other containers may block and/or otherwise restrict access to other types of functions such as, for example, accessing data in certain locations, communicating with various network endpoint, etc.

Figure 4:
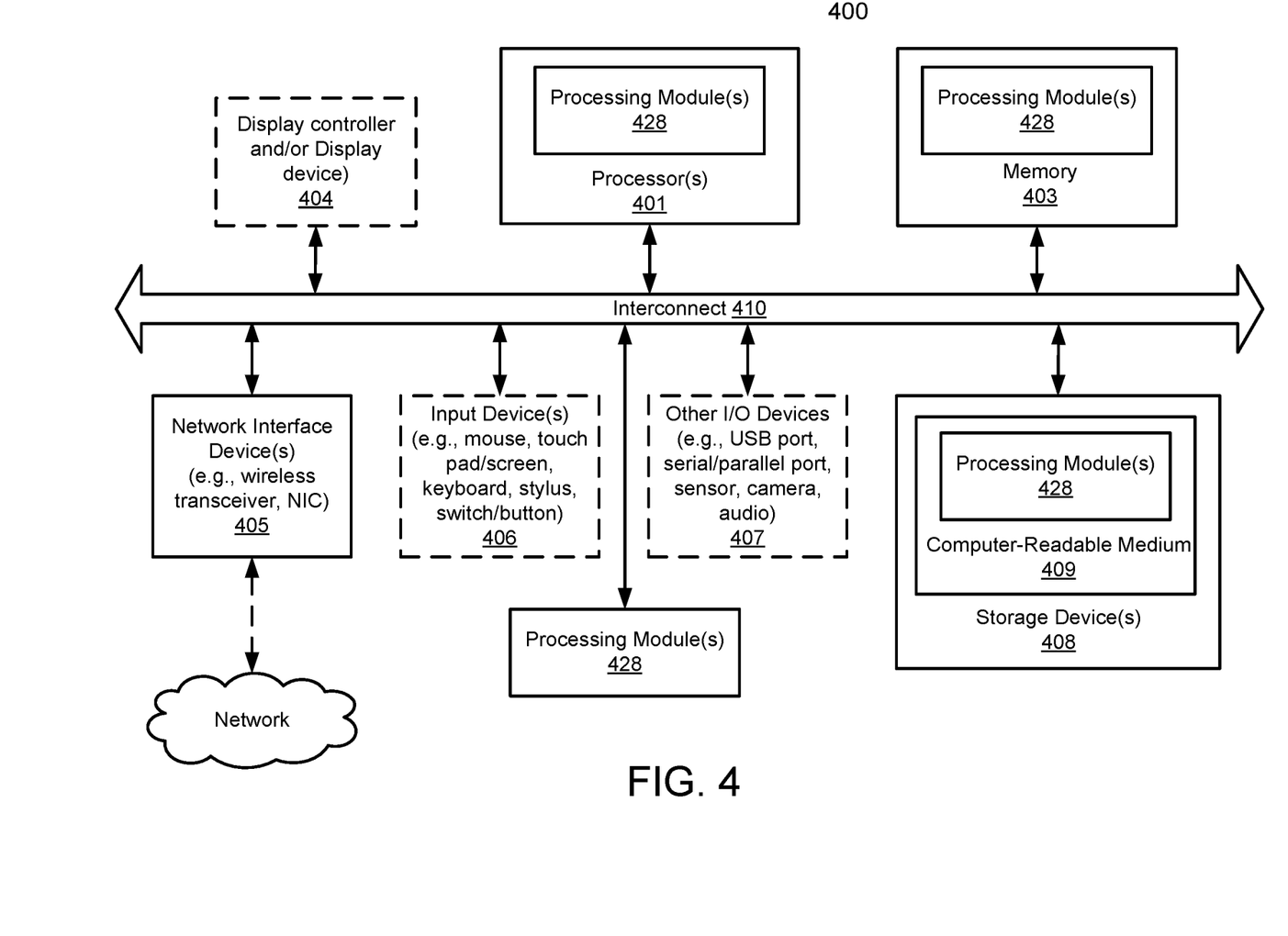
FIG. 4 shows a block diagram illustrating a data processing system in accordance with an embodiment.

Any of the components illustrated in FIGS. 1A-2C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of endpoint devices of edge infrastructure, the method comprising:
   obtaining a container definition for a containerized service requested by a requestor;
   instantiating a first container based on a first portion of the container definition, the first portion of the container definition being based on a requestor activity profile for the requestor, the requestor activity profile being based on at least two measured activity profiles of users classified as having a same persona, the requestor being one of the users, and the at least two measured activity profiles specify characteristics of the users of corresponding endpoint devices of the endpoint devices used to provide other instances of the containerized service to the users;
   instantiating a second container hosted by the first container to obtain an instance of the containerized service, the second container being based on a second portion of the container definition; and
   providing computer implemented services using the containerized service hosted by an endpoint device of the endpoint devices.

2. The method of claim 1, wherein providing the computer implemented services comprises:
   activating a function of an application hosted by the second container; and
   preventing, by the first container, at least a first portion of the function from being completed by the second container.

3. The method of claim 2, wherein the second container is adapted to enforce at least one selected from a group consisting of:
   a limit on use of a processor core of the endpoint device; and
   a limit on use of memory of the endpoint device.

4. The method of claim 2, wherein providing the computer implemented services further comprises:
   preventing, by the second container, at least a second portion of the function from being completed.

5. The method of claim 4, wherein the second container is adapted to enforce at least one selected from a group consisting of:
- a limit on accessing data stored in directories of the endpoint device; and
- a limit on access to network endpoints through the endpoint device.

6. The method of claim 1, wherein the requestor activity profile specifies a first set of limits on use of the endpoint device by the requestor and the first set of limits comprises:
- a first limit on use of hardware resources of the endpoint device;
- a second limit on use of applications hosted or that can be hosted by the endpoint device;
- a third limit on use of portions of data hosted or that can be hosted by the endpoint device; and
- a fourth limit on distribution, by the requestor, of the data hosted by the endpoint device.

7. The method of claim 1, wherein the second portion of the container definition is based on a service activity profile that specifies a second set of limits on use of the endpoint device by at least one application that provides, at least in part, the containerized service.

8. The method of claim 7, wherein the first container is adapted to enforce the first set of limits and the second container is adapted to enforce the second set of limits.

9. The method of claim 7, wherein the second set of limits comprising:
- a maximum quantity of computing resources of the endpoint device usable to provide the containerized service;
- a network connectivity limit for the containerized service;
- a network reachability limit for the containerized service; and
- a storage area access limit for the containerized service.

10. The method of claim 7, wherein the service activity profile is based on the at least two measured activity profiles of the users classified as having the same persona, and the at least two measured activity profiles further specifying characteristics of applications used to provide other instances of the containerized service.

11. A non-transitory machine-readable medium having instructions stored therein, which when executed by a processor, cause the processor to perform operations for managing operation of endpoint devices of edge infrastructure, the operations comprising:
- obtaining a container definition for a containerized service;
- instantiating a first container based on a first portion of the container definition, the first portion of the container definition being based on a requestor activity profile for the requestor, the requestor activity profile being based on at least two measured activity profiles of users classified as having a same persona, the requestor being one of the users, and the at least two measured activity profiles specify characteristics of the users of corresponding endpoint devices of the endpoint devices used to provide other instances of the containerized service to the users;
- instantiating a second container hosted by the first container to obtain an instance of the containerized service, the second container being based on a second portion of the container definition; and
- providing computer implemented services using the containerized service hosted by an endpoint device of the endpoint devices.

12. The non-transitory machine-readable medium of claim 11, wherein providing the computer implemented services comprises:
- activating a function of an application hosted by the second container; and
- preventing, by the first container, at least a first portion of the function from being completed by the second container.

13. The non-transitory machine-readable medium of claim 12, wherein the second container is adapted to enforce at least one selected from a group consisting of:
- a limit on use of a processor core of the endpoint device; and
- a limit on use of memory of the endpoint device.

14. The non-transitory machine-readable medium of claim 12, wherein providing the computer implemented services further comprises:
- preventing, by the second container, at least a second portion of the function from being completed.

15. The non-transitory machine-readable medium of claim 11, wherein the second portion of the container definition is based on a service activity profile that specifies a second set of limits on use of the endpoint device by at least one application that provides, at least in part, the containerized service.

16. A management system, comprising:
- a processor; and
- a memory coupled to the processor to store instructions, which when executed by the processor, cause the processor to perform operations for managing operation of endpoint devices of edge infrastructure, the operations comprising:
  - obtaining a container definition for a containerized service;
  - instantiating a first container based on a first portion of the container definition, the first portion of the container definition being based on a requestor activity profile for the requestor, the requestor activity profile being based on at least two measured activity profiles of users classified as having a same persona, the requestor being one of the users, and the at least two measured activity profiles specify characteristics of the users of corresponding endpoint devices of the endpoint devices used to provide other instances of the containerized service to the users;
  - instantiating a second container hosted by the first container to obtain an instance of the containerized service, the second container being based on a second portion of the container definition; and
  - providing computer implemented services using the containerized service hosted by an endpoint device of the endpoint devices.

17. The management system of claim 16, wherein providing the computer implemented services comprises:
- activating a function of an application hosted by the second container; and
- preventing, by the first container, at least a first portion of the function from being completed by the second container.

18. The management system of claim 17, wherein the second container is adapted to enforce at least one selected from a group consisting of:
- a limit on use of a processor core of the endpoint device; and
- a limit on use of memory of the endpoint device.

19. The management system of claim 17, wherein providing the computer implemented services further comprises:
 preventing, by the second container, at least a second portion of the function from being completed.

20. The management system of claim 16, wherein the second portion of the container definition is based on a service activity profile that specifies a second set of limits on use of the endpoint device by at least one application that provides, at least in part, the containerized service.

* * * * *